United States Patent
Okubo et al.

(10) Patent No.: US 7,078,006 B2
(45) Date of Patent: Jul. 18, 2006

(54) CARBON MATERIAL FOR PRODUCING METAL-INCLUDING FULLERENE IN HIGH YIELD

(75) Inventors: Hiroshi Okubo, Kagawa (JP); Toshiaki Sogabe, Ibaraki (JP); Tetsuro Tojo, Osaka (JP); Kyoko Noro, Tokyo (JP); Hisanori Shinohara, Aichi (JP)

(73) Assignee: Toyo Tanso Co., Ltd., Osaka (JP)

( * ) Notice: Subject to any disclaimer, the term of this patent is extended or adjusted under 35 U.S.C. 154(b) by 526 days.

(21) Appl. No.: 10/251,964

(22) Filed: Sep. 23, 2002

(65) Prior Publication Data

US 2004/0057893 A1 Mar. 25, 2004

(51) Int. Cl.
*C01B 31/30* (2006.01)

(52) U.S. Cl. ................. 423/439; 423/440; 252/502
(58) Field of Classification Search ............ 423/439, 423/440; 252/502
See application file for complete search history.

(56) References Cited

U.S. PATENT DOCUMENTS

| 4,161,512 | A | * | 7/1979 | Merzhanov et al. ........ 423/440 |
| 5,451,389 | A | * | 9/1995 | Sherif ........................ 423/439 |
| 5,456,986 | A | * | 10/1995 | Majetich et al. ............ 428/403 |
| 6,183,714 | B1 | * | 2/2001 | Smalley et al. ............ 423/447.3 |
| 2001/0016283 | A1 | * | 8/2001 | Shiraishi et al. ......... 429/218.2 |

* cited by examiner

*Primary Examiner*—Stanley S. Silverman
*Assistant Examiner*—Rebecca M. Stadler
(74) *Attorney, Agent, or Firm*—Oblon, Spivak, McClelland, Maier & Neustadt, P.C.

(57) ABSTRACT

A carbon material for producing endohedral metallofullerenes in a high yield is made of a mixture of a metal or metal compound with a carbonaceous material and is used in producing a endohedral metallofullerenes, wherein said carbon material contains a metal carbide and a bulk density of said carbon material is set to 1.80 g/cm³ or less.

8 Claims, 5 Drawing Sheets

CARBON MATERIAL FOR PRODUCING METAL-INCLUDING FULLERENE IN HIGH YIELD

BACKGROUND OF THE INVENTION

The present invention relates to a carbon material for producing metal-including fullerene (hereinafter means to endohedral metallofullerenes) in a high yield from which endohedral metallofullerenes used as micro electronic circuits in a microelectronics field or contrast media for MRI in a medical field can be produced in a high yield, and more specifically relates to a carbon material for producing endohedral metallofullerenes in a high yield consisting of a mixture of a metal or a metal compound used as an electrode in arc discharge or a target for laser irradiation with a carbonaceous material.

Endohedral metallofullerenes have been produced by methods comprising the steps of evaporating a raw material between a metal or metal compound-containing carbon electrode and an electrode block by arc discharge using the carbon electrode as the raw material, recovering produced soot, and extracting the endohedral metallofullerenes from the recovered soot or comprising the steps of irradiating metal or metal compound-containing carbon material with a laser, recovering soot produced by evaporating it from said carbon material and extracting the endohedral metallofullerenes from the recovered soot, or comprising the steps of causing high electric-current to flow to a metal or metal compound-containing carbon material to evaporated the carbon material, recovering produced soot and extracting the endohedral metallofullerenes from the recovered soot.

However, in these, methods, an amount of the endohedral metallofullerenes extracted from the produced soot are small because an amount of the produced soot is small. Additionally the endohedral metallofullerenes extracted from this soot are only about $1/100$ to $1/10$ of the amount of the soot. Thus there is a problem that a yield of the endohedral metallofullerenes is too small in industrially producing it.

SUMMARY OF THE INVENTION

It is, accordingly, an object of the present invention is to provide a carbon material for producing endohedral metallofullerenes in a high yield, which can produce and recover the endohedral metallofullerenes in a remarkably higher yield than those by conventional methods.

The present inventors have studied to solve the above-described problems and found that endohedral metallofullerenes can be produced and recovered at remarkably higher yield by changing a metal or metal compound-containing carbon material with higher density, which has been used when producing endohedral metallofullerenes, to that with lower and forming a metal carbide by performing heat treatment at high temperature, than in a case where a carbon material, which does not contain a conventional metal carbide with high density, and completed the present invention.

That is, a carbon material for producing endohedral metallofullerenes in a higher yield according to the present invention is a carbon material, which is a mixture of a metal or metal compound with a carbonaceous material, containing a metal carbide and having a bulk density of 1.80 g/cm$^3$. Further, it is preferred that 0.2 to 20 parts by mass of said metal or metal compound is contained with respect to 100 parts by mass of said carbonaceous material. Further, it is preferred that said carbonaceous material is a graphite material obtained by adding 30 to 100 parts by mass of a thermosetting resin as a binder to 100 parts by mass of artificial graphite powder and mixing them and baking the mixture.

The carbon material for producing endohedral metallofullerenes in a high yield (hereinafter referred to as a carbon material for producing fullerene) according to the present invention is obtained by mixing metal powder or metal compound powder with carbonaceous material powder and a raw material, which can be carbonized as required as a binder, and baking the mixture. Then the mixture is formed in a rod-shaped form or a flat-shaped form in accordance with its production method. The sectional shapes of the rod may have a rectangular shape, a circular shape, a polygonal shape and the like and are not limited particularly, but the entire shape of the rod is preferably a bar.

The metal or metal compound used is not limited particularly, and most of the metals included in the periodic law table can be used. These metals or metal compounds are contained in a carbon material for producing fullerene in as-is forms or contained as a metal carbide by reacting with a carbonaceous material of a raw material during baking. Then the obtained metal carbide is included in fullerene at a stage where it is evaporated and formed by arc discharge between electrodes, laser irradiation or the like. Particularly, among metals a gadolinium (hereinafter referred to as Gd)-including fullerene and a dysprosium (hereinafter referred to as Dy)-including fullerene can be made water-soluble and can be used as contrast media for the medical magnetic resonance imagining (MRI) by adding OH group.

As carbonaceous materials for the raw material artificial graphite powder, carbon fiber powder, so-called meso-phase small sphere powder and the like are used. Particularly, artificial graphite powder is especially preferable.

Further, a raw material, which can be carbonized as a binder as required, may be a compound, which is carbonized during baking at an increased temperature and finally functions as one component of a carbon material for producing fullerene while it is mixed with powder of a carbonaceous material. The raw materials concretely include tar, pitch groups, aromatic polycyclic organic compound, synthetic resin, thermosetting resin, polymer compounds such as phenol resin, furan resin, imido resin, amido resin and the like, especially condensation type synthetic polymer, natural polymer and the like. Among them the phenol resin having high carbonizating yield and strength after baking is preferable.

The above-mentioned metal or metal compound, carbonaceous material and the binder are mixed by an optional method. In the mixing ratios the metal or metal compound powder is 0.2 to 20 parts by mass and the binder is 30 to 100 parts by mass with respect to 100 parts by mass of the carbonaceous material. When the binder has less than 30 parts by mass of the binder with respect to 100 parts by mass of the carbonaceous material, a carbon material for producing a fullerene having sufficient strength cannot be obtained. On the other hand, when it exceeds 100 parts of mass, the features of the carbon material is lost and the density is likely to be increased, that is it is likely to exceed 1.80 g/cm$^3$. Accordingly, the binder is 30 to 100 parts by mass, preferably 40 to 70 parts by mass with respect to 100 parts by mass of the carbonaceous material. Such mixing ratio can make a bulk density of a carbon material for producing fullerene to 1.80 g/cm$^3$ or less, preferably 1.78 g/cm$^3$ or less, more preferably 1.74 g/cm$^3$ or less, after containing the metal or the metal compound. Furthermore, when the metal or the metal compound is less than 0.2 parts by mass with respect to 100 parts by mass of the carbonaceous material, a fullerene such as $C_{82}$, $C_{84}$, $C_{90}$ is formed other than endohedral metallofullerenes. Even if it exceeds 20 parts by mass, a yield of a endohedral metallofullerenes is not especially increased.

Then, after molding the mixed powder at said mixing ratio in an optional shape, provisional baking (primary baking) is performed at 600 to 1300° C., and subsequently baking is performed at a temperature of 1600° C. or more in vacuum to make a carbon material for producing fullerene. Then by subjecting the carbon material to heat treatment and baking at 1300 to 2500° C., preferably 1600 to 2200° C., the mixed metal is reacted with a carbonaceous material to form a metal carbide. At this time the metal carbide is uniformly dispersed in a microscopic analysis by thermal diffusion and the production efficiency of endohedral metallofullerenes can be enhanced.

BRIEF DESCRIPTION OF THE DRAWINGS

Preferred embodiments of the present invention will now be described in detail, by way of example only, with reference to the accompanying drawings, in which:

FIG. 4 shows X-ray diffraction results of carbon materials for producing endohedral metallofullerenes having different treatment temperatures and showing the production of carbides of Dy at each heat treatment temperature, and particularly

DETAILED DESCRIPTION OF THE PREFERRED EMBODIMENT

Endohedral metallofullerenes can be produced by the steps of using the thus prepared carbon material for producing a fullerene as an electrode for arc discharge or as a target for laser irradiation under atmosphere of inert gas, recovering produced soot, and extracting solvents from the recovered soot. The production method of the endohedral metallofullerenes will be described now by an example using an arc discharge device. It is noted that the present invention is not limited to the endohedral metallofullerenes produced by this arc discharge device. The explanation of the production of fullerene by the use of laser irradiation or the like will be omitted here since the structure of the device and the like is the same as in the case of the arc discharge device.

Figure 1:
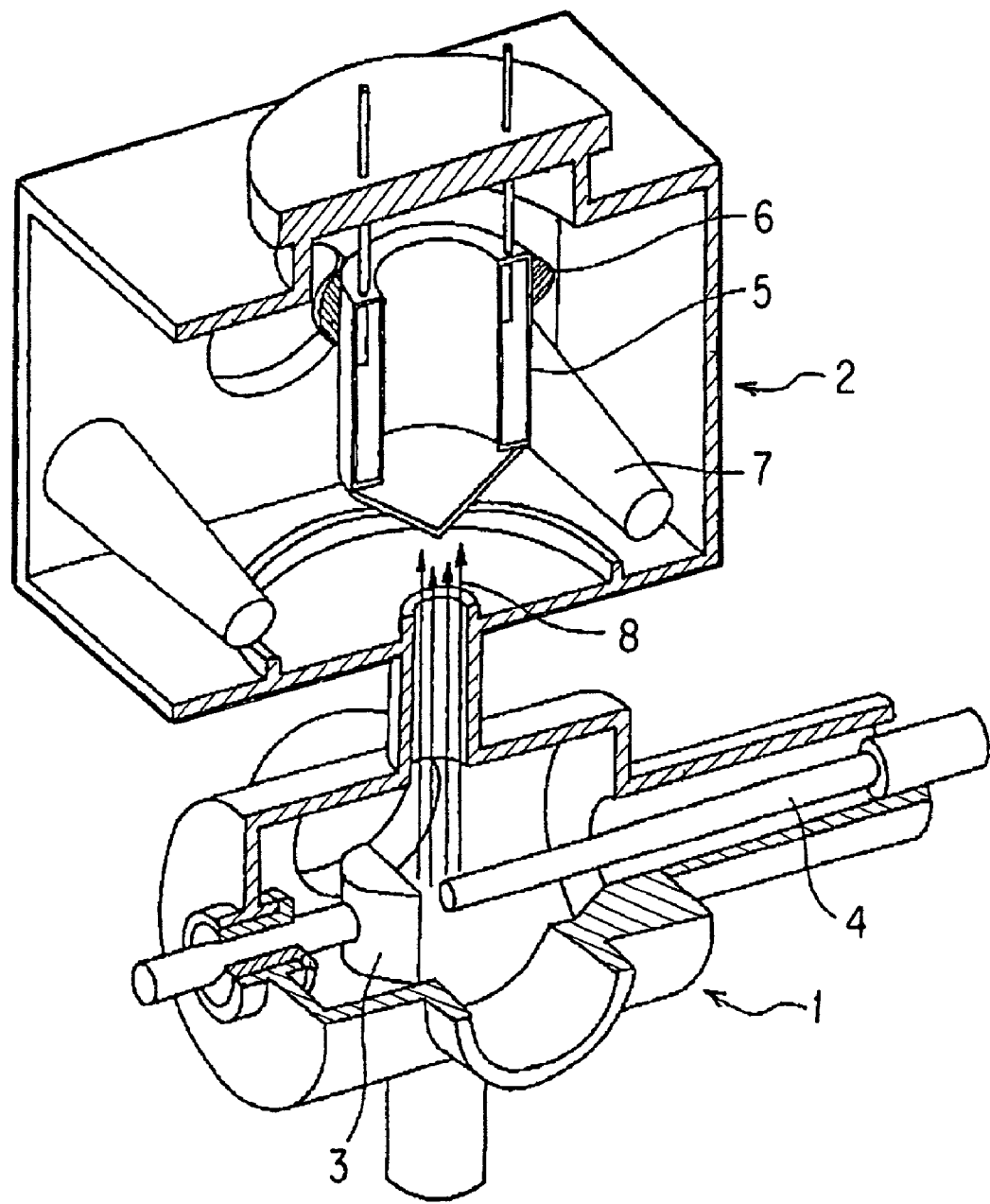
FIG. 1 is a cross-sectional view showing a diagrammatic sketch of an arc discharge device, which is one example for producing endohedral metallofullerenes according to the present invention.

FIG. 1 shows a perspective schematic view of an arc discharge device having functions of soot recovery and solvent extraction under atmosphere of inert gas such as dry nitrogen or the like. In FIG. 1, the reference numeral 1 denotes a discharge chamber, 2 a recovery glow box, 3 a cathode electrode block, 4 a rod-shaped anode electrode made of a carbon material for producing fullerene according to the present invention, 5 a liquid nitrogen trap, 6 an automatic feeding brush, 7 a recovering globe, and 8 soot containing a endohedral metallofullerenes produced by arc discharge carried with helium.

In FIG. 1, about 60% of soot 8 containing endohedral metallofullerenes produced by the discharge chamber 1 is sent to the glove box 2 for recovering soot, positioned at an upper portion of the discharge device through the flow of helium gas of about 5 kPa and is adhered to a surface of the trap 5 cooled at a liquid nitrogen temperature. The adhered soot 8 containing endohedral metallofullerenes is collected on a soot recovery dish positioned on a bottom of a recovery chamber by fixed automatic feeding brush 6. Thus the collected soot 8 is recovered in a soot recovery bottle (not shown) by the recovering globe 7.

As described above, since the soot recovery is carried out in dry nitrogen under atmosphere of an inert gas, the production and extraction efficiency of general fullerenes such as $C_{60}$ etc. can be further enhanced and at the same time the production and extraction efficiency of endohedral metallofullerenes can be enhanced as compared with a case where it is carried in the air. Further, by setting the density of a carbon material for producing fullerene to 1.80 g/cm$^3$ or less, which is a density of the general high density graphite material, and by causing a metal carbide to contain, electric current density in a minimal region is increased by the arc discharge. As a result the amount of soot produced is increased and the endohedral metallofullerenes to be extracted are further significantly increased as compared with a production of the endohedral metallofullerenes by a conventional method, whereby the recovery efficiency of the endohedral metallofullerenes can be enhanced.

EXAMPLES

Example 1

16 parts by mass of dysprosium oxide ($Dy_2O_3$) ground to an average particle diameter of 5 μm and about 10 parts by mass of methyl alcohol and furfuryl alcohol were added to 100 parts by mass of artificial graphite powder (having an average particle diameter of 5 to 15 μm, produced by TOYO TANSO Co., Ltd.) and they were mixed with a Z mixer. After that about 50 parts by mass of a novolac phenol resin were added to the mixture and the obtained mixture was further kneaded under heating conditions to complete the mixing. Then the mixture was primarily ground so that the average particle diameter was 30 to 60 μm. After that the mixed powder was molded at a pressure of 10 MPa at a room temperature to obtain a green block. Then the green block was buried into packing powder (carbon powder) by use of an iron sagger and subjected to primary baking at 1100° C. packing, and subsequently it was subjected to heat treatment at 1600° C. under vacuum to obtain a rod-shaped carbon material for producing fullerene. The obtained carbon material for producing fullerene had a bulk density of 1.59 g/cm$^3$, a Shore hardness of 33, a bending strength of 13 MPa, a compression strength of 42 MPa, an elastic modulus of 6.2 GPa, an coefficient of thermal expansion of 4.3×10$^{-6}$/° C. (room temperature to 400° C.) and a resistivity of 38 μ·m (room temperature).

Example 2

A rod-shaped carbon material for producing fullerene was prepared by the same way as in Example 1 except that a molding pressure in the molding was set to 60 to 80 MPa. The obtained carbon material for producing fullerene had a bulk density of 1.74 g/cm$^3$, a Shore hardness of 49, a bending strength of 25 MPa, a compression strength of 75 MPa, an elastic modulus of 10.0 GPa, a coefficient of thermal expansion of 4.0×10$^{-6}$/° C. (room temperature to 400° C.) and a resistivity of 29 μΩ·m (room temperature).

Example 3

A rod-shaped carbon material for producing fullerene was prepared by the same way as in Example 1 except that after the primary baking was performed at 1100° C. heat treatment was performed at 2000° C. under vacuum. The obtained carbon material for producing fullerene had a bulk density of 1.78 g/cm$^3$, a Shore hardness of 45, a bending strength of 20 MPa, a compression strength of 65 MPa, all elastic modulus of 9.0 GPa, a coefficient of thermal expansion of 4.3×10$^{-6}$/° C. (room temperature to 400° C.) and a resistivity of 25 μΩ·m (room temperature).

Comparative Example 1

A rod-shaped carbon material for producing fullerene was prepared by the same way as in Example 1 except that a molding pressure in the molding was set to 100 MPa and no heat treatment was performed at 1600° C. under vacuum. The obtained carbon material for producing fullerene had a bulk density of 1.81 g/cm$^3$, a Shore hardness of 55, a bending strength of 26 MPa, a compression strength of 70 MPa, an elastic modulus of 8.6 GPa, a coefficient of thermal expansion of 4.3×10$^{-6}$/° C. (room temperature to 400° C.) and a resistivity of 46 μΩ·m (room temperature).

Comparative Example 2

A rod-shaped carbon material for producing fullerene was prepared by the same way as in Example 1 except that after the molded piece obtained in the same way as in Example 1 was subjected to primary baking at 1100° C. and heat treatment at 2500° C. under vacuum. The obtained carbon material for producing fullerene had a bulk density of 1.80 g/cm$^3$, a Shore hardness of 40, a bending strength of 15 MPa, a compression strength of 55 MPa, an elastic modulus of 8.0 GPa, a coefficient of thermal expansion of 4.4×10$^{-6}$/° C. (room temperature to 400° C.) and a resistivity of 22 μ·m (room temperature).

Comparative Example 3

A rod-shaped carbon material for producing fullerene was prepared by the same way as in Example 1 except that the heat treatment condition was set to 1500° C. The obtained carbon material for producing fullerene had a bulk density of 1.58 g/cm$^3$, a Shore hardness of 35, a bending strength of 15 MPa, a compression strength of 45 MPa, an elastic modulus of 6.2 GPa, a coefficient of thermal expansion of 4.3×10$^{-6}$/° C. (room temperature to 400° C.) and a resistivity of 39 μΩ·m (room temperature).

Each of the rod-shaped carbon materials for producing fullerene in Examples 1 to 3 and Comparative Examples 1 to 3 was used as an anode electrode bar 4 in the arc discharge type production device shown in FIG. 1 and produced soot was recovered by a recovery glove box 2 using a discharge current of 400 to 450 A, and a discharge voltage of 20 to 25 V and a helium gas atmosphere flow of the pressure 6 to 8 kPa in a discharge chamber 1. Further, with an evaporation rate of each carbon material for producing fullerene during arc discharge, the carbon material for producing fullerene of Example 1 was 5.5 to 6.5 mm/min, the carbon material for producing fullerene of Example 2 was 4 to 5 mm/min, the carbon material for producing fullerene of Example 3 was 6 to 7 mm/min, the carbon material for producing fullerene of Comparative Example 1 was 1 to 2 mm/min, the carbon material for producing fullerene of Comparative Example 2 was 2 to 3 mm/min, the carbon material for producing fullerene of Comparative Example 3 was 5.0 to 5.5 mm/min. Further, with the production amounts of soot, the carbon material for producing fullerene of Example 1 was about 30 g from 120 g of the carbon material for producing fullerene, the carbon material for producing fullerene of Example 2 was about 30 g from 120 g of the carbon material for producing fullerene, the carbon material for producing fullerene of Example 3 was about 35 g from 120 g of the carbon material for producing fullerene, the carbon material for producing fullerene of Comparative Example 1 was about 23 g from 120 g of the carbon material for producing fullerene, the carbon material for producing fullerene of Comparative Example 2 was about 25 g from 120 g of the carbon material for producing fullerene, the carbon material for producing fullerene of Comparative Example 3 was about 30 g from 120 g of the carbon material for producing fullerene. Additionally, the absence and presence of metal carbide were checked. These results were summarized in Table 1.

TABLE 1

| | Characteristics of carbon material for producing fullerene | | | | | | | Production conditions | | Remarks |
| | Bulk density (g/cm$^3$) | Shore hardness (Hs) | Bending strength (MPa) | Compression strength (MPs) | Elastic modulus (GPa) | Coefficient of thermal expansion 10$^{-6}$/° C. (room temperature to 400° C.) | Resistivity room Temperature (μΩ · m) | Evaporation rate (mm/min) | Production amount of sool (g) | Production of metal carbide |
| --- | --- | --- | --- | --- | --- | --- | --- | --- | --- | --- |
| Example 1 | 1.59 | 33 | 13 | 42 | 6.2 | 4.3 | 38 | 5.5–6.5 | 30 | ○ |
| Example 2 | 1.74 | 49 | 25 | 75 | 10.0 | 4.0 | 29 | 4–5 | 30 | ○ |
| Example 3 | 1.78 | 45 | 20 | 65 | 9.0 | 4.3 | 25 | 6–7 | 35 | ○ |

TABLE 1-continued

Characteristics of carbon material for producing fullerene

| | Bulk density (g/cm³) | Shore hardness (Hs) | Bending strength (MPa) | Compression strength (MPs) | Elastic modulus (GPa) | Coefficient of thermal expansion $10^{-6}/°C.$ (room temperature to 400° C.) | Resistivity room Temperature (μΩ · m) | Production conditions Evaporation rate (mm/min) | Production amount of sool (g) | Remarks Production of metal carbide |
|---|---|---|---|---|---|---|---|---|---|---|
| Comparative Example 1 | 1.81 | 55 | 26 | 70 | 8.6 | 4.3 | 46 | 1–2 | 23 | X |
| Comparative Example 2 | 1.80 | 40 | 15 | 55 | 8.0 | 4.4 | 22 | 2–3 | 25 | X |
| Comparative Example 3 | 1.58 | 35 | 15 | 45 | 6.2 | 4.3 | 39 | 5.0–5.5 | 30 | X |

Next, the soot recovered when the carbon materials for producing fullerene of Examples 1 and 2 were used as electrodes, was extracted with carbon disulfide for about 24 hours by use of an Soxhlet apparatus. The amounts of extracted fullerene were about 3 g from an extracted solution of Example 1, and about 4.8 g from an extracted solution of Example 2. The extracted solutions were analyzed by a laser elimination flight time type mass spectrometer.

Figure 2A:
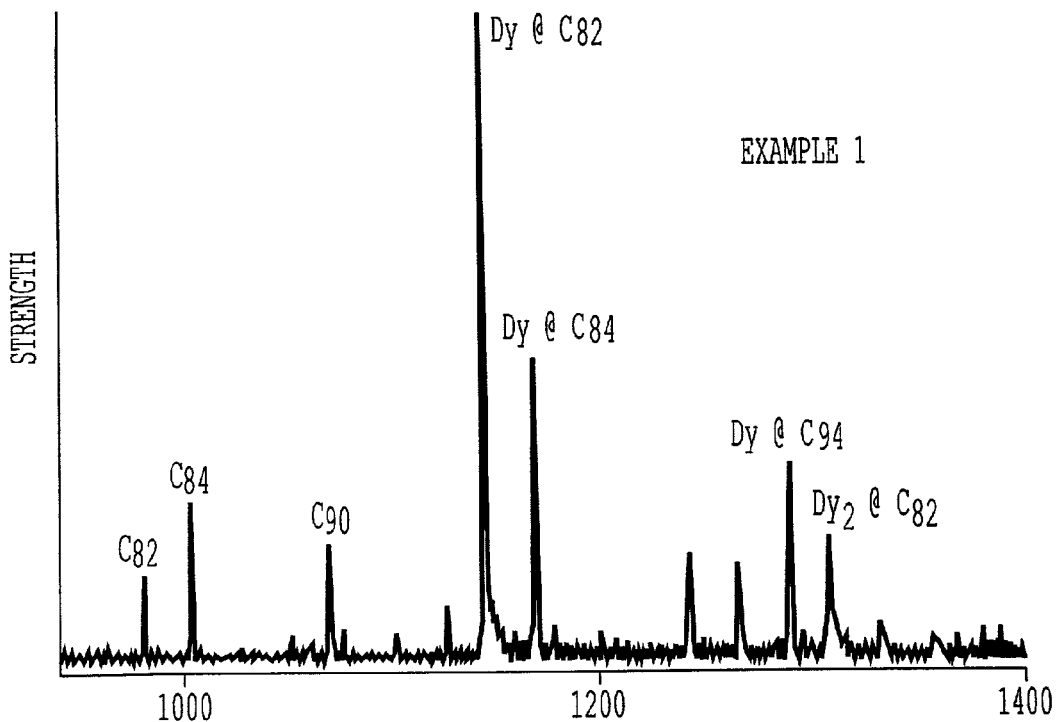
FIG. 2 is a view showing an analysis result by a laser elimination flight time type mass spectrometer for an extracted solution from recovered soot.
Figure 2B:
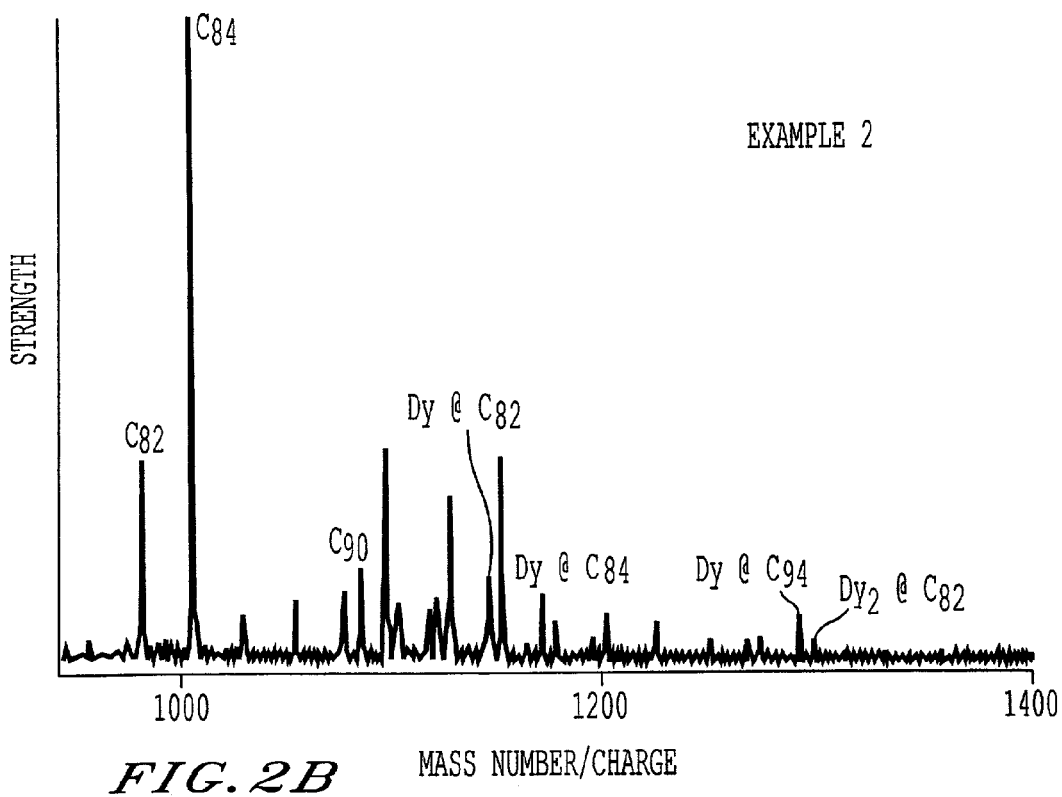

The analytical results by the laser elimination flight time type mass analytical meter are shown in FIG. 2.

As apparent from FIG. 2, since strong peaks were detected respectively at the positions corresponding to Dy $C_{82}$, Dy $C_{84}$, Dy $C_{94}$, and $Dy_2 C_{82}$, it can be recognized that carbon clusters having compositions of Dy $C_{82}$, Dy $C_{84}$, Dy $C_{94}$, and $Dy_2 C_{82}$ was produced and extracted. Further, even if the carbon cluster is ionized by a laser, the composition is not broken. Thus, the clusters can be conceived to be fullerenes Dy @ $C_{82}$, Dy @ $C_{84}$, and Dy @ $C_{94}$ including one Dy respectively, and $Dy_2$ @ $C_{82}$ including two Dys. Further, it can be found that Example 1 having a lower bulk density has a larger strength in endohedral metallofullerenes Dy @$C_{82}$, Dy @$C_{84}$, Dy @ $C_{82}$, and other high-level fullerenes $C_{82}$, $C_{84}$, $C_{90}$ and the like have low strength.

Figure 3:
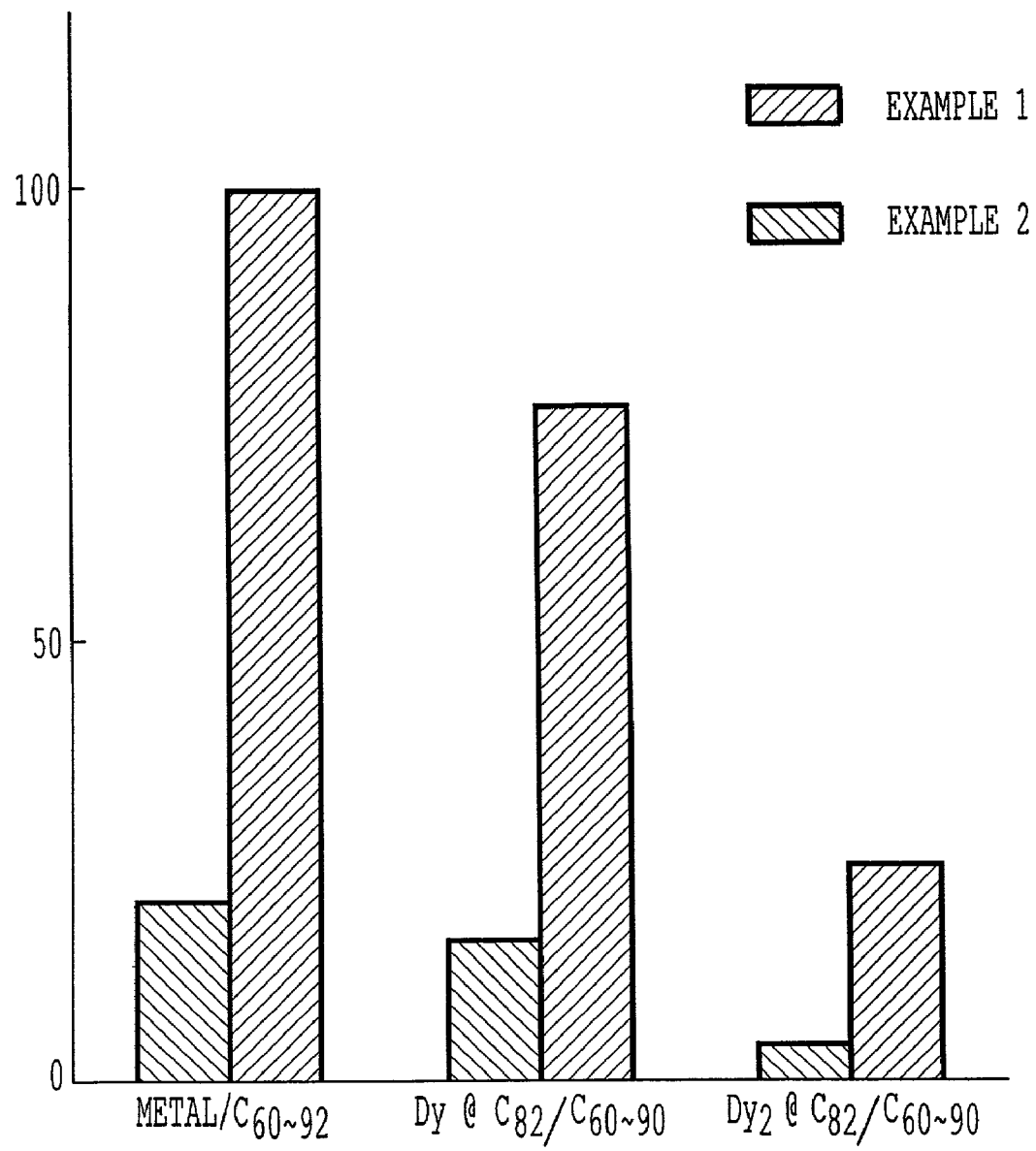
FIG. 3 is a view showing the ratios of endohedral metallofullerenes Dy @ $C_{82}$, Dy @ $C_{84}$, Dy @ $C_{94}$ and $Dy_2$@ $C_{82}$ in extracted all fullerenes and relative production amounts of Dy @ $C_{82}$ and $Dy_2$@ $C_{82}$.

FIG. 3 shows the contents of endohedral metallofullerenes Dy @ $C_{82}$, Dy @ $C_{84}$, Dy @ $C_{94}$ and $Dy_2$ @ $C_{82}$ in extracted all fullerenes including high-level fullerenes such as $C_{82}$, $C_{84}$, Dy @$C_{94}$ and the like, and relative production amounts of Dy @ $C_{82}$ and $Dy_2$ @ $C_{82}$ respectively. As apparent from FIG. 3, it can be confirmed that Example 1 having lower bulk density contains more metal-including fullerene Dy @ $C_{82}$, Dy @ $C_{84}$, Dy @ $C_{94}$ and $Dy_2$ @ $C_{82}$.

Figure 4A:
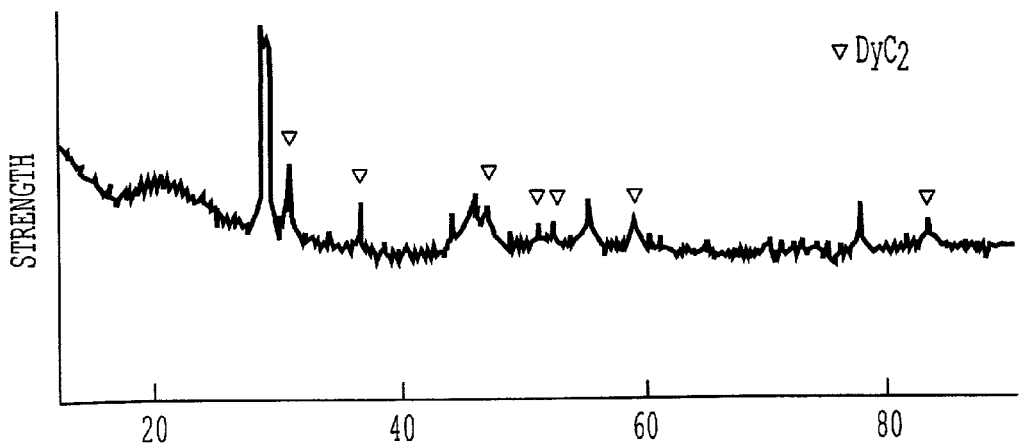
FIGS. 4(a), 4(b) and 4(c) show results of a carbon material for producing endohedral metallofullerenes in Example 3, Comparative Example 1, and Comparative Example 2, respectively.
Figure 4B:
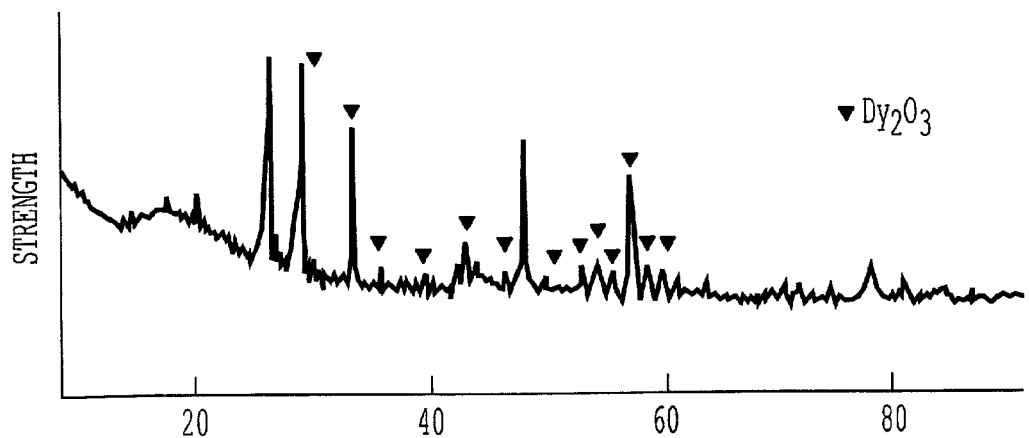
Figure 4C:
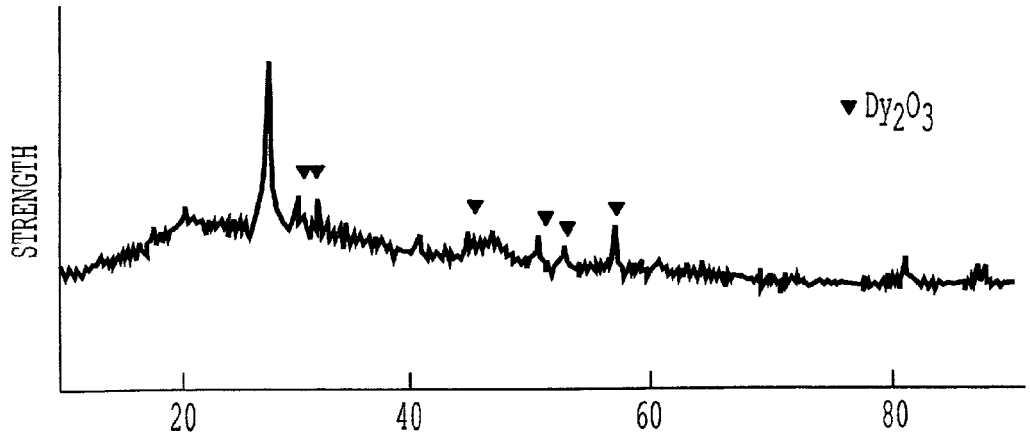

FIG. 4 is X-ray diffraction results showing the progressing rate of carbonization of Dy on each carbon material for producing fullerene in Example 3 and Comparative Examples 1 and 2. Particularly, FIG. 4(a) shows Example 3 at a heat treatment temperature of 2000° C., FIG. 4(b) shows Comparative Example 1 at a heat treatment temperature of 1100° C., and FIG. 4(c) shows Comparative Example 2 at a heat treatment temperature of 2500° C. From FIG. 4(a) it can be found that Dy is reacted with a carbon material by heat treatment at 2000° C. to form $DyC_2$. On the other hand, in FIG. 4(b) $Dy_2O_3$ has been found and it can be found that Dy exists in a state of oxide previously mixed. Further, from FIG. 4(c) $DyC_2$ cannot be found at all in Dy heat treated at 2500° C. in Comparative Example 2. This is because Dy cannot exist in a state of carbide in the temperature region of 2500° C. and it sublimated at a temperature region near 2200° C., which is the boiling point of Dy.

Figure 5:
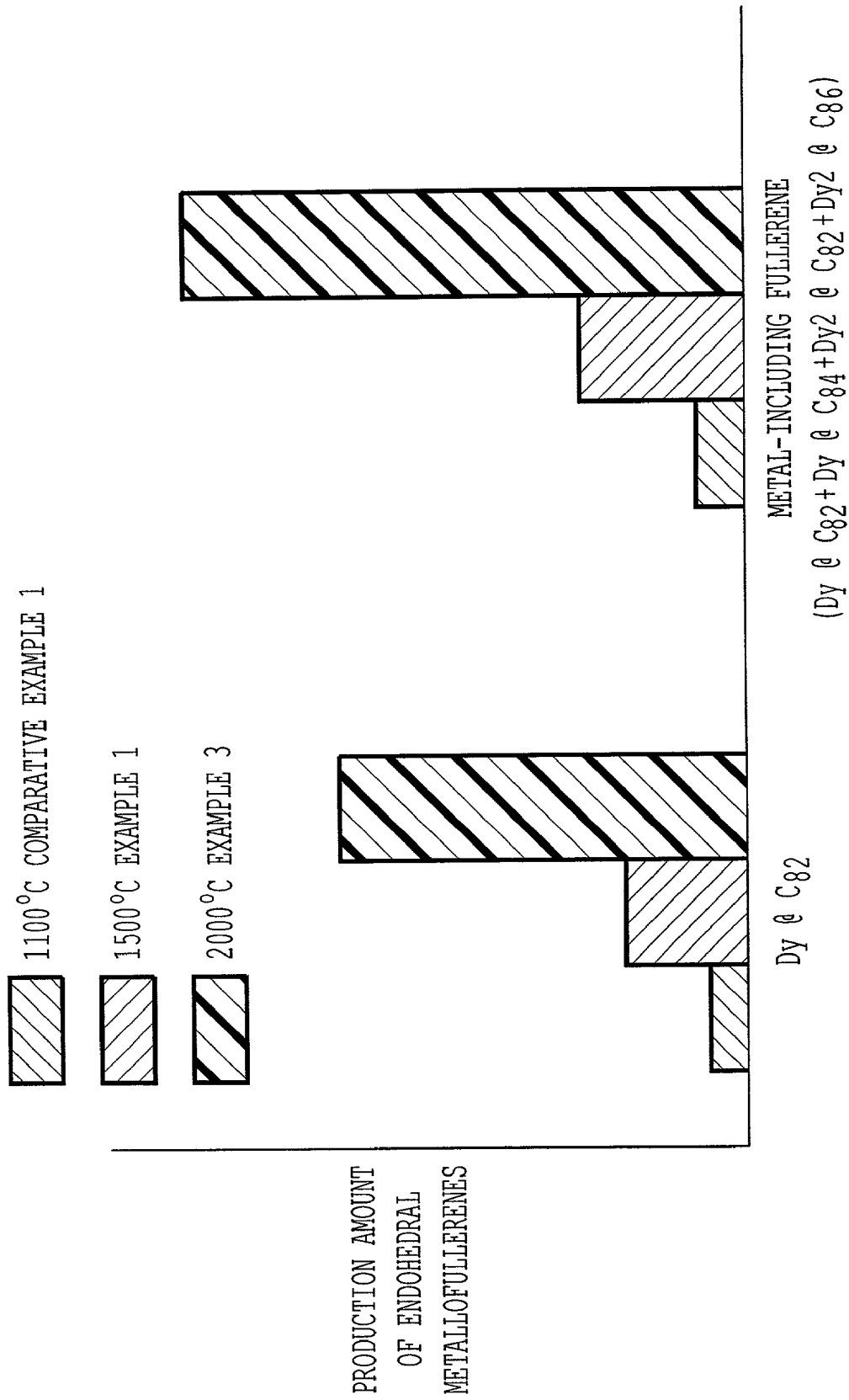
FIG. 5 is a view showing relationships between different heat treatment and the production amounts of endohedral metallofullerenes.

FIG. 5 show the comparison of the production amounts of endohedral metallofullerenes in cases where carbon materials for producing fullerene were used as electrodes in Examples 1 and 2 and Comparative Example 1. From FIG. 5, it can be found that Examples 1 and 3 in which Dy was heat treated at 1600° C. or more where Dy is carbonized, produce significantly more endohedral metallofullerenes as compared with Comparative Example 1. Further, as shown in FIG. 4, it can be found that when the carbon material in Example 3 where heat treatment was performed at 2000° C. to form $DyC_2$ and it is uniformly dispersed in the carbon material, is used, a production amount of endohedral metallofullerenes are significantly increased.

The carbon materials for producing endohedral metallofullerenes in a high yield according to the present invention are configured as described. Thus, by causing the carbon material to contain a metal carbide and setting a bulk density to 1.80 g/cm³ or less, endohedral metallofullerenes, especially a endohedral metallofullerenes used as contrast media for the medical MRI and the like can be produced at remarkably high yield than those by using a conventional carbon material for producing a endohedral metallofullerenes.

What is claimed is:

1. A heat treated carbon material for producing endohedral metallofullerenes in a high yield wherein the metal is dysprosium or gadolinium prepared by baking and heat treating a mixture comprising 0.2 to 20 parts by mass of the metal or metal compound of said metal with respect to 100 parts by mass of a carbonaceous material and used in producing endohedral metallofullerenes, wherein said heat treated carbon material contains a uniformly dispersed dysprosium or gadolinium carbide produced by the heat treatment and the bulk density of said carbon material is set to 1.80 g/cm³ or less.

2. A heat treated carbon material for producing endohedral metallofullerenes in a high yield prepared by baking and heat treatment according to claim 1, wherein said carbonaceous material of the mixture is a graphite material obtained by adding 30 to 100 parts by mass of a thermosetting resin to 100 parts by mass of artificial graphite powder as a binder to mix with each other and baking the mixture.

3. A heat treated carbon material for producing endohedral metallofullerenes in a high yield according to claim 1 obtained by heat treating a mixture obtained by adding 0.2 to 20 parts by mass of the metal or metal compound powder to 100 parts by mass of artificial graphite powder, mixing them and thereafter baking and heat treating the same, usable as an electrode for arc discharge or a target irradiation under an atmosphere of inert gas.

4. A heat treated carbon material for producing endohedral metallofullerenes in a high yield according to claim 1 obtained by heat treating a mixture obtained by adding 0.2 to 20 parts by mass of metal or metal compound powder to 100 parts by mass of artificial graphite powder, mixing them and thereafter baking and heat treating the same, usable as an electrode for arc discharge or a target irradiation under an atmosphere of inert gas.

5. A shaped molded form comprising the heat treated carbon material of claim 1.

6. The shaped molded material of claim 5 wherein the heat treatment occurs at 1300–2500° C.

7. The shaped molded material of claim 6 wherein the metal or metal compound is dysprosium or dysprosium oxide.

8. The shaped molded product of claim 6 wherein the metal or metal compound is dysprosium oxide.

* * * * *